United States Patent Office 3,804,914
Patented Apr. 16, 1974

3,804,914
RUTHENIUM(II) COMPLEXES AS CATALYSTS FOR SELECTIVE HYDROGENATION OF CYCLIC POLYENES TO CYCLIC MONOENES
Darryl R. Fahey, Bartlesville, Okla., assignor to Phillips Petroleum Company, Bartlesville, Okla.
No Drawing. Continuation-in-part of abandoned application Ser. No. 256,767, May 25, 1972. This application June 25, 1973, Ser. No. 373,403
Int. Cl. C07c 5/02
U.S. Cl. 260—666 A                    21 Claims

ABSTRACT OF THE DISCLOSURE

Cyclic polyenes are selectively hydrogenated to cyclic monoenes under suitable hydrogenation conditions in the presence of a ruthenium(II) catalyst complex having the general formula $L_nRuX_m$ wherein L is a ligand, X is a halogen or hydrogen, $n$ equals 2, 3 or 4, $m$ equals 2 or 3, and the sum of $n+m$ equals 4, 5 or 6. A novel process for the preparation of $(Ph_3P)_2(CO)_2RuCl_2$ is also described.

---

This application is a continuation-in-part of copending application Ser. No. 256,767, filed May 25, 1972, now abandoned.

This invention relates to a process for the selective hydrogenation of cyclic polyenes to cyclic monoenes carried out in the presence of a ruthenium(II) catalyst complex, and a process for the preparation of ruthenium(II) catalyst complexes.

Various catalytic hydrogenation processes employing ruthenium compounds are known in the art, including the processes described in U.S. Pats. 3,454,644 and 3,488,400. None of the disclosure, however, provides a suitable means for selectively hydrogenating a cyclic polyene to a cyclic monoene.

An object of this invention is to provide a selective hydrogenation process for the conversion of cyclic polyenes to cyclic monoenes. Other objects of this invention will be apparent from the written description and the appended claims.

In one embodiment of this invention, an improved process for the selective hydrogenation of a cyclic polyene to a cyclic monoene has been found which comprises hydrogenation of a cyclic polyene to a cyclic monoene in the presence of a ruthenium(II) catalyst complex. In another embodiment, improved processes for the preparation of a ruthenium(II) catalyst complex have been found.

The cyclic polyenes that can be employed in the practice of this invention comprise any polyunsaturated olefin having at least 6 carbon atoms and at least 2 ethylenic double bonds. Suitable cyclic polyenes include cyclododecatriene, 4 - n - butylcyclododecatriene, 2,4 - dimethylcyclododecatriene, 1-cyclohexylcyclododecatriene, 1-phenylcyclododecatriene 1,5-cyclooctadiene, 1,4-cyclooctadiene, 1,4-cyclohexadiene, 1,3 - cyclohexadiene, bicyclo[2.2.1]hepta-2,5-diene, bicyclo[2.2.2]octa-2,5-diene, and the like, and mixtures thereof.

The ruthenium(II) catalyst complexes that can be employed in the practice of this invention comprise ligand-complexed divalent ruthenium(II) compounds. The term divalent ruthenium is employed herein to describe a ruthenium atom which has two of its electrons participating in chemical bond formation.

In general, the ruthenium(II) catalyst complexes that can be employed in the process of this invention can be described by Formula A:

(A) $L_nRuX_m$ wherein L is a ligand selected from $NR_3$, $PR_3$, $AsR_3$, $SbR_3$, $SR_2$, ROH, CO, $R_2P-R'-PR_2$ and pyridine, each R being the same or different is selected from alkyl, cycloalkyl, and aryl radicals or combination thereof, R' is an alkylene radical, X is a halogen or hydrogen, $n$ is an integer of 2, 3 or 4, $m$ is an integer of 2 or 3, and the sum of $n+m$ is the integer of 4, 5 or 6. Wherein L is a ligand represented by the general Formula $R_2P-R'-PR_2$ such a ligand can function as two of the L ligands of Formula A. Preferably, each R radical contains 1 to 12 carbon atoms. Representative of R radicals include methyl, ethyl, n-butyl, cyclohexyl, n-dodecyl, phenyl, benzyl, p-tolyl, 4-n-hexylphenyl, 3,5-dimethylphenyl, 2-naphthyl, and the like. Preferably, each R' radical contains 1 to 4 carbon atoms.

A preferred ruthenium(II) catalyst complex can be described by Formula B:

(B) $(LL)_p(CO)_qRuX_r$ wherein LL is a ligand selected from $NR_3$, $PR_3$, $AsR_3$, $SbR_3$, $p$ is an integer of 2 or 3, $q$ is an integer of 1 or 2, $r$ is the integer 2, the sum of $p+q+r$ equals the integer 6, and R and X are as previously defined. Even more preferred are ruthenium(II) catalysts of Formula B wherein $p$, $q$, and $r$ are each the integer 2.

Illustrative of individual ruthenium(II) catalyst complexes that can be employed in the practice of this invention are those represented by the formulas $(Ph_3P)_2(CO)_2RuCl_2$ $(Ph_3P)_3(CO)RuH_2$, $[(CO)_2RuCl_2]_x$, $(C_5H_5N)_4RuCl_2$, $(C_5H_5N)_2(CO)_2RuCl_2$, $[Ph_2PCH_2CH_2PPh_2]_2RuCl_2$, $(Ph_3P)_3RuCl_2$, $(Ph_3P)_2(CO)_2RuHCl$, $(Ph_3P)_3(CO)RuCl_2$, $(Ph_3P)_3(CO)RuHCl$ and the like and mixtures thereof. In the foregoing, Ph represents phenyl, Et represents ethyl, $C_5H_5N$ represents pyridine, and $x$ is an integer of at least 2 and indicates the polymeric nature of the complex. If desired, complexes such as $(Ph_3P)_3(CO)RuCl_2$ can be transformed to the more preferred complex $(Ph_3P)_2(CO)_2RuCl_2$ by passing carbon monoxide into a refluxing solution of the monocarbonyl complex in a high boiling polar solvent, e.g., 2-methoxyethanol.

In addition to individual ruthenium(II) catalyst complexes, complexes of ruthenium(II) treated with sodium borohydride ($NaBH_4$) reducing agents can be employed with good results. Suitable examples of the above include the following: $(C_5H_5N)_4RuCl_2/NaBH_4$, $(C_5H_5N)_2(CO)_2RuCl_2/NaBH_4$, $[Ph_2PCH_2CH_2PPh_2]_2RuCl_2NaBH_4$ Illustrative of individual ruthenium(III) catalyst complexes that can be employed in the practice of this invention are those represented by the formulas: $(Et_2S)_3RuCl_3$, $(Ph_3P)_2(CH_3OH)RuCl_3$. Said compounds are generically referred to in this invention as ruthenium(II) compounds since said compounds are considered under the hydrogenation reaction conditions of this invention to be active in the form of ruthenium(II) catalyst complexes.

Known methods for preparation of the above individual complexes are disclosed by Hallman et al. J. Chem. Soc., A, 3143 (1968); Stephenson et al., J. Inorg. Nucl. Chem., 28, 945 (1966); Abel et al. J. Chem. Soc. 3178 (1959); Collman and Roper, J. Am. Chem. Soc., 87, 4008 (1965); Fergusson et al., J. Chem. Soc., 2627 (1965); Chatt et al., J. Chem. Soc., 896 (1961); James and Markham, Inorg. Nucl. Chem. Letters, 7, 373 (1971); and Chatt, Shaw and Field, J. Chem. Soc., 3466 (1964).

A particularly preferred embodiment of this invention comprises the selective hydrogenation of cyclic polyenes in the presence of the ruthenium(II) catalyst complex $(Ph_3P)_2(CO)_2RuCl_2$ wherein a ligand forming compound selected from the group consisting of CO, $NR_3$, $PR_3$, $AsR_3$, R being as previously defined, is present during the hydrogenation process in quantities in excess of the mole ligand requirements of the ruthenium(II) catalyst complex. Preferably, in general, a ligand mole excess within the range of from 0.001 to 50 moles, more preferably within the range of from 5 to 25 moles for $NR_3$, $PR_3$ and $AsR_3$ compounds, per mole of ruthenium catalyst complex is employed. If CO is employed, it is more preferred that the ligand mole excess be in the range of about 0.001 to about 5 moles per mole of ruthenium complex. As the amount of diluent employed may vary, it will generally be desirable that the concentration of the excess ligand in the reaction mixture be in the range of about 0.001 to about 1 mole of excess ligand per liter of reaction mixture and preferably in the range of about 0.01 to about 0.5 mole of excess ligand per liter of reaction mixture, for ligands other than CO. When CO is employed as the excess ligand, its concentration as excess ligand will generally be in the range of about 0.001 to about 0.1 mole of CO per liter of reaction mixture. Higher concentration of excess CO may tend to deactivate the catalyst.

In another embodiment of the invention, the ruthenium (II) catalyst complexes are prepared in the presence of the cyclic polyene under hydrogenation conditions such that the ruthenium(II) catalyst is formed and the cyclic polyene is selectively hydrogenated in essentially one operation. In one process of this type, a ruthenium halide in a solvent is contacted briefly with CO in the presence of another ligand forming compound, such as triphenylphosphine, and a cyclic polyene. Thereafter hydrogen pressure is applied and the cyclic polyene is hydrogenated to the cyclic monoene in the presence of the newly formed ruthenium(II) catalyst. In another process of this type, a zerovalent ruthenium complex such as $(Ph_3P)_2(CO)_3Ru$ is contacted briefly with a hydrogen halide or an alkyl halide in the presence of the cyclic polyene and preferably in the presence of another ligand forming compound, such as triphenylphosphine. Thereafter hydrogen pressure is applied to selectively hydrogenate the cyclic polyene to the cyclic monoene in the presence of the newly formed ruthenium(II) catalyst. The selective hydrogenation process can be carried out in any reaction media comprising a solvent, a cyclic polyene and a ruthenium (II) catalyst complex. Suitable solvents include cyclic polyene, present in amounts sufficient to function in both a reactant and a solvent capacity, ligand forming solvents as well as substantially nonreactive or inert solvents. Suitable substantially non-reactive and/or inert solvents include benzene, toluene, cumene, isooctane, cyclohexane, ethanol, 1-butanol, ethyl acetate, tetrahydrofuran, and the like, and combinations thereof.

Particularly preferred solvents in the practice of this invention are ligand forming solvents described by Formulas C and D:

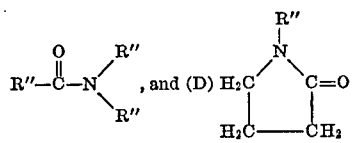

wherein each R" is the same or different, each R" is selected from hydrogen, alkyl or cycloalkyl radicals or combinations thereof. Preferably, each R" radical contains 1 to 12 carbon atoms. Specific examples of preferred solvents are N,N-dimethylformamide, N,N-dimethylacetamide, N-methylpyrrolidone, and the like, or mixtures thereof.

The hydrogenation process of this invention can be carried out under any suitable hydrogenation conditions comprising contact of suitable proportions of a cyclic polyene and a ruthenium(II) catalyst complex. In general, suitable proportions comprise ruthenium(II) catalyst complex cyclic polyene mole ratios of from 0.0001/1.0 to 1.0/1.0, respectively. Catalyst recycle hydrogenation conditions can be employed for convenience and economy advantageously, if desired, since substantially none or very little of the catalyst efficiency is lost during the hydrogenation process, even when the process is carried out in the presence of air or oxygen. Suitable hydrogenation temperature conditions vary in accord with the effective temperature range of the ruthenium(II) catalyst complexes. The ruthenium(II) catalyst complex effective temperature range is defined herein as the difference between the lowest activity temperature of the catalyst and the decomposition temperature of the catalyst, e.g., a temperature difference of about 85° C. in the case of $(Ph_3P)_2(CO)_2RuCl_2$ based on an activity temperature of at least 115° C. and a decomposition temperature in excess of about 200° C. Other catalyst species may have effective temperature ranges within the range of from 25° C. to 225° C. Suitable pressures, generally, are within the range of from about 0 to about 600 p.s.i.g.

The selective hydrogenation behavior of the ruthenium (II) catalyst complexes for cyclic polyenes to cyclic monoenes can often be employed to advantage in separation processes wherein cyclic monoenes are desired to be separated from mixtures comprising cyclic and/or acyclic polyenes having similar boiling points. Subjection of such mixtures to hydrogenation conditions in the presence of the ruthenium(II) catalyst complexes produces mixtures of cyclic monoenes with acyclic monoenes which can generally be separated by simple fractional distillation. For example, the recovery of cyclopentene from a mixture thereof with cis- and trans-1,3-pentadiene can be accomplished according to the above procedure.

The following examples illustrate the processes of this invention and are not intended to be unduly limitative of the scope thereof.

EXAMPLE I

A series of runs was carried out wherein 12 mmole of 1,5,9-cyclododecatriene was hydrogenated in the presence of 0.13 mmole of $(Ph_3P)_2(CO)_2RuCl_2$ under reaction conditions comprising hydrogen pressures within the range of from 150 to 220 p.s.i.g., temperatures within the range of from 140° C. to 160° C., the presence of 30 ml. of a solvent and varying reaction periods. The solvents, reaction time, as well as the reaction products of the runs are set out in Table I. The reaction products are reported on a weight percent basis.

TABLE I

| Run No. | Solvent | Reaction period, hours | Reaction products (wt. percent) | | | |
|---|---|---|---|---|---|---|
| | | | CDA [1] | CDE [2] | CDD [3] | CDT [4] |
| 1 | N-methylpyrrolidone | 2.5 | 1.0 | 94.6 | 3.2 | 1.2 |
| 2 | N,N-dimethylformamide | 3 | 9.0 | 85.6 | 3.7 | 1.7 |
| 3 | N,N-dimethylacetamide | 3 | 16.2 | 75.7 | 5.4 | 2.7 |
| 4 | Tetrahydrofuran | 2.5 | 11.3 | 55.1 | 16.5 | 17.0 |
| 5 | Ethyl acetate | 2 | 34.2 | 48.4 | 9.3 | 8.1 |
| 6 | 1-Butanol | 2 | 39.0 | 47.1 | 8.6 | 5.3 |
| 7 | Benzene | 2 | 24.1 | 45.2 | 12.3 | 18.4 |
| 8 | Sulfolane | 7 | 0.1 | 27.1 | 28.2 | 44.7 |
| 9 | Acetonitrile | 3 | 0 | 0.1 | 3.9 | 96.0 |
| 10 | Dimethylsulfoxide [5] | 29 | 1.0 | 97.8 | 0.9 | 9.5 |

[1] CDA=cyclododecane.
[2] CDE=cyclododecene.
[3] CDD=cyclododecadiene.
[4] CDT=cyclododecatriene.
[5] CAUTION.—In two of four reactions, a vigorous decomposition of the reaction solution occurred causing the reaction vessel to burst.

The above data demonstrates the efficacy of ruthenium(II) catalyst complexes in the selective hydrogenation of cyclododecatriene to cyclododecene, as well as the varying degrees of selectivity associated with various solvents employed in the hydrogenation processes of this invention. Run 9 demonstrates that acetonitrile is unsuited as a solvent to the hydrogenation process.

As illustrated by the data set out hereinbefore, improved hydrogenation selectivity occurs in the presence of ligand forming solvents and in the absence of excess of catalyst complex ligands selected from amines, arsines, and phosphines (note Example III hereafter).

EXAMPLE II

A series of runs was carried out wherein 12 mmole of 1,5,9-cyclododecatriene in 20 ml. of N,N-dimethylformamide was hydrogenated under a hydrogen pressure within the range of from 150 to 225 p.s.i.g., at temperatures within the range of from 105° to 145° C. in the presence of 0.10 g. of the ruthenium(II) catalyst complex designated in Table II. The reaction products are reported on a weight percent basis.

TABLE II

| Run No. | Catalyst | Reaction period, hours | CDA[1] | CDE[2] | CDD[3] | CDT[4] |
|---|---|---|---|---|---|---|
| 11 | $(Ph_3P)_2(CO)_2RuCl_2$ | 4 | 13.3 | 84.7 | 1.8 | 0.3 |
| 12 | $(Ph_3P)_3(CO)RuH_2$ | 5 | 5.3 | 74.8 | 13.2 | 6.7 |
| 13 | $(Ph_3P)_3RuCl_2$ | 5 | 31.4 | 51.1 | 8.4 | 9.1 |
| 14 | $(Et_2S)_3RuCl_3$ | 3.5 | 2.8 | 92.6 | 3.2 | 1.4 |
| 15 | $(Ph_3P)_2(CH_3OH)RuCl_3$ | 4.5 | 14.3 | 80.4 | 4.2 | 1.1 |
| 16 | $[(CO)_2RuCl_2]_x$ | 3.3 | 0.2 | 22.8 | 38.4 | 38.6 |
| 17 | $(Py)_4RuCl_2$ | 3 | 2.3 | 36.0 | 30.2 | 31.5 |
| 18 | $(Ph_3P)_3RuCl_2$[5] | 4 | 42.3 | 29.6 | 15.6 | 12.4 |
| 19 | $(Py)_4RuCl_2$—$NaBH_4$[6] | 1.8 | 36.0 | 59.8 | 2.4 | 1.7 |
| 20 | $(Py)_2(CO)_2RuCl_2$—$NaBH_4$[7] | 2.2 | 21.8 | 47.2 | 15.5 | 15.5 |
| 21 | $[Ph_2PCH_2CH_2PPh_2]_2RuCl_2$—$NaBH_4$[7] | 2.1 | 8.6 | 29.0 | 22.5 | 39.9 |

[1][2][3] and [4] are as defined in Table I hereinbefore.
[5] In benzene solution at 85° C.
[6] 0.10 g. of $NaBH_4$.
[7] 0.050 g. of $NaBH_4$.

The above data demonstrates the degree of hydrogenation selectivity obtained with related ruthenium(II) catalyst complexes.

EXAMPLE III

A series of runs were carried out wherein 11 mmole of 1,5,9-cyclododecatriene in 20 ml. of benzene was hydrogenated under a hydrogen pressure within the range of 175 to 200 p.s.i.g., at temperatures within the range of 140 to 160° C. in the presence of 0.13 mmole of $(Ph_3P)_2(CO)_2RuCl_2$. Excess mole quantities of various ligand forming compounds were employed in each run. The type and amount of excess ligand on a mole basis and the reaction products obtained are reported on a weight percent basis in Table III.

TABLE III

| Run No. | Excess added ligand | Ligand molar excess[a] | CDA[1] | CDE[2] | CDD[3] | CDT[4] |
|---|---|---|---|---|---|---|
| 22 | Triphenylphosphine | 0.068 | 1.9 | 98.1 | 0 | 0 |
| 23 | do | 0.13 | 0.6 | 97.8 | 1.5 | 0.5 |
| 24 | do | 0.034 | 4.4 | 95.6 | 0 | 0 |
| 25 | do | 0.017 | 10.5 | 88.9 | 0 | 0.6 |
| 26 | Diethylamine | 0.050 | 36.1 | 63.0 | 0.7 | 0.2 |
| 27 | Triphenylarsine | 0.015 | 26.6 | 53.7 | 9.7 | 10.0 |
| 28 | Tributylphosphine | 0.01 | 29.8 | 51.6 | 9.5 | 7.9 |
| 29 | None | 0.00 | 24.1 | 45.2 | 12.3 | 18.4 |
| 30 | CO[5] | [b] <6 | 0.1 | 45.7 | 30.2 | 24.0 |
| 31 | Triphenylphosphine oxide | 0.016 | 97.4 | 2.5 | 0 | 0.1 |
| 32 | Trioctylphosphine oxide | 0.01 | 96.7 | 3.3 | 0 | 0 |

[1][2][3] and [4] are as defined in Table 1 hereinabove.
[5] Reaction apparently ceased before completion of hydrogenation.
[a] Molar excess based on solutions of 0.006 M $(Ph_3P)_2(CO)_2RuCl_2$, 0.55 M CDT, and 20 ml. of benzene.
[b] P.s.i.g.

The above data demonstrates the improvement in selective hydrogenation of cyclododecatriene to cyclododecene which results when ligand forming compounds selected from amines, arsines, and phosphines are employed in excess of the molar stoichiometric ligand requirements of the ruthenium(II) catalyst complex. Additionally, the above data illustrate that triphenylphosphine when employed in excess as a ligand forming compound in conjunction with $(Ph_3P)_2(CO)_2RuCl_2$ significantly improves the selective hydrogenation of cyclododecatriene to cyclododecene. Control Runs 31 and 32 additionally demonstrate that the phosphine oxides added had no effect on the hydrogenation selectivity.

EXAMPLE IV

A mixture of 0.10 g. (0.38 mg.-atom Ru) ruthenium trichloride hydrate, 1.5 mmole triphenylphosphine, 12.3 mmole 1,5,9-cyclododecatriene in 20 ml. of ethanol solvent was contacted with CO at 4 p.s.i.g. and subsequently was contacted and pressurized with hydrogen at a pressure range of 138 to 209 p.s.i.g., at a temperature of from 118° C. to 140° C. for 100 minutes. The reaction products obtained, reported on a weight basis, were as follows: 2 percent cyclododecane, 98 percent cyclododecene, 0.0 percent cyclododecadiene, and 0.0 percent cyclododecatriene.

The above data demonstrate the novel process for the preparation of a ruthenium (II) catalyst complex in the presence of cyclododecatriene, and subsequent selective hydrogenation of cyclododecatriene to cyclododecene without having to isolate or otherwise manipulate the catalyst.

EXAMPLE V

Two other runs were carried out in which the selective hydrogenation of 1,5,9-cyclododecatriene (CDT) was carried out in the puresence of catalysts obtained by the treatment of $(Ph_3P)_2(CO)_3Ru$ with HCl under conditions described below:

RUN 34

Tricarbonylbis(triphenylphosphine)ruthenium(O)

(0.05 g.), triphenylphosphine (0.20 g.), 1,5,9-cyclododecatriene (1.00 g.) and ethanol (10 ml. were charged to a 3-oz. glass pressure tube. The contents of the tube were stirred and pressured with hydrogen to 180 p.s.i.g., raised to 131° C./231 p.s.i.g. over a 40-minutes period, and then maintained at 131–146° C./215–260 p.s.i.g. with continued stirring for 45 minutes without reaction under these conditions, the presence of triphenylphosphine appearing to inhibit hydrogenation with the ruthenium(O) complex.

The above mixture was cooled, the pressure vented, the void volume above the reaction mixture was flushed with gaseous hydrogen chloride for approximately 2 seconds, the tube resealed, and repressured with hydrogen to 180 p.s.i.g. The reaction mixture was stirred and raised to 138° C./262 p.s.i.g. over a 1-hour 20-minute period. The pressure was then vented to 220 p.s.i.g. and subsequently maintained at 138–150° C./201–230 p.s.i.g. with continued stirring for 3.5 hours. The product mixture was allowed to cool, was suction filtered and the filtrate analyzed indicating: cyclododecane, 0.1%; cyclododecene, 92.5%; cyclododecadiene, 5.4%; cyclododecatriene, 2.0%. The colorless filter cake was identified by elemental analysis as dichlorodicarbonylbis(triphenylphosphine)ruthenium-(II).

Analysis.—Calcd. for $(Ph_3P)_2(CO)_2RuCl_2$ (percent): C, 60.7; H, 4.02. Found (percent): C, 60.9; H, 4.00.

RUN 35

A 20-ml. benzene solution of $(Ph_3P)_2(CO)_3Ru$ (0.007 M) containing 11 mmole CDT was treated with HCl and with hydrogen (175–200 p.s.i.g.) at a temperature of 140 to 160° C. during which reaction period the catalyst $(Ph_3P)_2(CO)_2RuCl_2$ was formed and hydrogenation of CDT took place. Analysis of the hydrogenation reaction products showed the presence of cyclododecane 30.0%; cyclododecene 66.9%; cyclododecadiene 3.1%; and cyclododecatriene 0%.

The results of the above two runs demonstrate that selective hydrogenation was achieved by treating the complex $(Ph_3P)_2(CO)_3Ru$ with HCl and $H_2$ in the presence of the cyclic polyene (CDT). In addition, the results also demonstrate that selectivity is much improved if the above reaction is carried out in the presence of triphenylphosphine (Run 34).

EXAMPLE VI

Other runs were conducted in which the catalyst $(Ph_3P)_2(CO)_2RuCl_2$ was employed in the presence of added triphenylphosphine for the selective hydrogenation of two other cyclic polyenes 1,5-cyclooctadiene and bicyclo[2.2.1]hepta-2,5-diene(norbornadiene). The runs were conducted with 0.066 mmole of the catalyst, 1.53 mmole added triphenylphosphine, 1.00 g. of the cyclic polyene in 20-ml. benzene at a temperature of 129–140° C. under a pressure of 150–194 p.s.i.g. hydrogen. The results of these runs are shown in Table IV below:

TABLE IV

| Run No. | Cyclic polyene | Cyclic reaction products (wt. percent) | | |
| --- | --- | --- | --- | --- |
| | | Alkanes | Alkenes | Polyenes |
| 36 | 1,5-cyclooctadiene | 6.1 | [1] 93.4 | [2] 0.8 |
| 37 | Norbornadiene | [3] 19.4 | 80.2 | 0.4 |

[1] Alkenes are cyclooctene (93.0%) and bicyclo[3.3.0]oct-2-ene (0.4%).
[2] 1,3-cyclooctadiene (0.8%).
[3] Alkanes are norbornane (2.4%) and nortricyclene (17.0%).

The above results demonstrate that high selectivity was achieved in the hydrogenation of these cyclic polyenes, 1,5-cyclooctadiene and norbornadiene, to the respective cyclic monoenes, cyclooctene and norbornene. The results also show the occurrence of cyclization and isomerization side reactions with these cyclic polyenes. However, in the case of 1,5-cyclooctadiene, isomerization to 1,3-cyclooctadiene appears to actually precede the hydrogenation reaction which produces the cyclooctene.

EXAMPLE VII

A 300-milliliter autoclave was charged with dichlorodicarbonylbis(triphenylphosphine)ruthenium(II) (0.050 g., 0.065 mmole), triphenylphosphine (1.00 g., 3.82 mmole), cyclododecatriene (50.3 g., 310 mmole) and benzene (20 ml.). The void volume was then flushed with nitrogen and pressured to 500 p.s.i.g. with hydrogen. Heat and rapid stirring were applied. Hydrogen absorption was observed and the pressure was maintained in the range of 400 to 600 p.s.i.g. This large scale reaction was notably exothermic making the reaction temperature difficult to maintain between 145–155° C. The maximum temperature was 170° C. reached momentarily. When hydrogen uptake ceased, usually requiring 1 to 1.5 hours, the product mixture was cooled and distilled at reduced pressure. The conversion was 96.9 percent comprising cyclododecane (5.6%), cyclododecene (91.0%), cyclodecadiene (3.4%), and cyclododecatriene (effectively 0%). The dark yellow distillation residue was taken up in 20 ml. of benzene and recycled with another 50 g. of cyclododecatriene, repeating the operations described above. In this manner the catalyst was recycled six times with the occasional addition of triphenylphosphine to compensate for its loss by oxidation to triphenylphosphine oxide occasioned by exposure to the atmosphere. A total of 343.3 g. of cyclododecatriene was reduced. The yields of cyclododecene ranged from 83 to 94 percent, usually being 91 to 93 percent per batch.

The above recycle catalyst study demonstrated that a minimum of 32,100 moles of cyclododecatriene can be selectively hydrogenated per mole of the ruthenium catalyst. This is equivalent to 50,000 pounds of cyclododecatriene per pound of ruthenium metal. No particular precautions were taken to exclude air, moisture or solvent impurities. No detectable loss in catalyst activity was observed.

Reasonable variations and modications are possible within the scope of the foregoing disclosure and the appended claims to the invention.

That which is claimed is:

1. A selective hydrogenation process which comprises contacting a cyclic polyene containing at least 6 carbon atoms and at least 2 ethylenic double bonds with hydrogen and a catalyst of Formula A:

(A) $L_nRuX_m$ wherein L is a ligand selected from $NR_3$, $PR_3$, $AsR_3$, $SbR_3$, $SR_2$, ROH, CO, $R_2P-R'-PR_2$ and pyridine, each R being individually selected from the group consisting of alkyl, cycloalkyl, and aryl radicals and combinations thereof, R' is an alkylene radical, each X is individually selected from the group consisting of the halogens and hydrogens, n is the integer 2, 3 or 4, m is the integer 2 or 3, the sum of $n+m$ is the integer 4, 5 or 6, under suitable hydrogenation conditions to hydrogenate said polyene.

2. A process in accordance with claim 1, wherein the contacting is carried out in the presence of a suitable organic solvent.

3. A process in accordance with claim 2, wherein said solvent is selected from compounds of the Formula II:

(II) 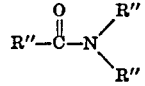

wherein each R" is individually selected from the group consisting of hydrogen, alkyl and cycloalkyl radicals and combinations thereof; and compounds of the Formula III:

(III) 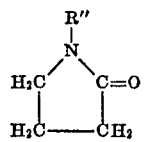

wherein R" is as previously defined.

4. A process in accordance with claim 3, wherein said solvent is selected from the group consisting of N,N-dimethylformamide, N,N-dimethylacetamide, and N-methylpyrrolidone and combinations thereof.

5. A process in accordance with claim 2, wherein said catalyst has the Formula B:

(B) $(LL)_p(CO)_qRuX_r$ wherein LL is a ligand selected from $NR_3$, $PR_3$, $AsR_3$, $SbR_3$, $p$ is the integer 2 or 3, $q$ is the integer 1 or 2, $r$ is the interger 2, the sum of $p+q+r$ equals the integer 6, and R and X are as previously defined.

6. A process in accordance with claim 5, wherein $p$, $q$, and $r$ are each the integer 2.

7. A process in accordance with claim 6, wherein the hydrogenation is carried out in the presence of an LL ligand present in amounts in excess of the LL ligand stoichiometric requirements of Formula B.

8. A process in accordance with claim 7, wherein the excess LL ligand is $(C_6H_5)_3P$ 9. A process in accordance with claim 6, wherein said catalyst of Formula B is prepared by contacting $RuX_3$, said LL ligand, CO and said cyclic polyene, wherein $RuX_3$ and LL ligand are each present in amounts at least equal to the stoichiometric requirements of Formula B, and CO is present in amounts at least in excess of the stoichiometric requirements of Formula B, and subsequently removing CO excess to the stoichiometric requirements of Formula B.

10. A process in accordance with claim 9, wherein said LL is $(C_6H_5)_3P$ and wherein said conditions include the presence of the solvent ethyl alcohol.

11. A process in accordance with claim 1 wherein said cyclic polyene is 1,5,9-cyclododecatriene.

12. A process in accordance with claim 1 wherein said cyclic polyene is 1,5-cyclooctadiene.

13. A process in accordance with claim 1 wherein said cyclic polyene is bicyclo[2.2.1]hepta-2,5-diene.

14. A process in accordance with claim 1 wherein said catalyst is $(PH_3P)_2(CO)_2RuCl_2$.

15. A process in accordance with claim 14 wherein the contacting is carried out in the presence of a ligand forming compound selected from the group consisting of CO, $NR_3$, $PR_3$, and $AsR_3$, R being as previously defined, said ligand forming compound being present in an amount in excess to the mole ligand requirements of said catalyst.

16. A process in accordance with claim 14 wherein the contacting is carried out in the presence of triphenylphosphine in excess of the mole ligand requirements of said catalyst.

17. A process in accordance with claim 14 wherein said catalyst is formed by reacting $(Ph_3P)_2(CO)_3Ru$ with HCl in the presence of a suitable organic diluent.

18. A process in accordance with claim 11, wherein the contacting is carried out in the presence of N,N-dimethylformamide.

19. A process in accordance with claim 11, wherein the contacting is carried out in the presence of N-methylpyrrolidone.

20. A process in accordance with claim 11, wherein the contacting is carried out in the presence of N,N-dimethylacetamide.

21. A process in accordance with claim 1 wherein said catalyst further comprises sodium borohydride.

References Cited
UNITED STATES PATENTS

| | | | |
|---|---|---|---|
| 3,488,400 | 1/1970 | Caudlin et al. | 260—677 H |
| 3,454,644 | 1/1969 | Dewhirst | 260—570.9 |
| 3,597,461 | 8/1971 | L'Eplattenir et al. | 260—429 |
| 2,944,094 | 7/1960 | Rylander et al. | 260—677 H |
| 3,391,206 | 7/1968 | Hartog | 260—666 A |
| 3,408,415 | 10/1968 | Dovell | 260—666 A |

DELBERT E. GANTZ, Primary Examiner

V. O'KEEFE, Assistant Examiner

U.S. Cl. X.R.

260—666; 252—429 R, 431 N, P, R